(12) United States Patent  
Heo et al.

(10) Patent No.: US 8,447,276 B2
(45) Date of Patent: May 21, 2013

(54) MOBILE TERMINAL AND METHOD OF CONTROLLING OPERATION OF THE SAME

(75) Inventors: Jeong Yun Heo, Seoul (KR); Hye Youn Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 956 days.

(21) Appl. No.: 12/171,100

(22) Filed: Jul. 10, 2008

(65) Prior Publication Data

US 2009/0042547 A1 Feb. 12, 2009

(30) Foreign Application Priority Data

Jul. 13, 2007 (KR) ........................ 10-2007-0070755

(51) Int. Cl.
*H04B 1/38* (2006.01)
*H04M 3/42* (2006.01)

(52) U.S. Cl.
USPC ...................... 455/414.1; 455/90.1; 455/90.2

(58) Field of Classification Search
USPC .......... 455/456.1–456.3, 456.6, 414.1–414.4, 455/418, 90.1–90.3; 370/338, 335, 342, 336, 370/347; 706/11; 710/3, 8–9
See application file for complete search history.

(56) References Cited

U.S. PATENT DOCUMENTS

| | | | | |
|---|---|---|---|---|
| 7,409,229 | B2* | 8/2008 | Choi | 455/563 |
| 2006/0020896 | A1* | 1/2006 | Cha | 715/740 |
| 2007/0008830 | A1* | 1/2007 | Tsukazaki et al. | 369/1 |
| 2007/0264969 | A1* | 11/2007 | Frank et al. | 455/404.2 |
| 2008/0108341 | A1* | 5/2008 | Baard | 455/418 |
| 2008/0261571 | A1* | 10/2008 | Zellner et al. | 455/414.1 |
| 2009/0167509 | A1* | 7/2009 | Fadell et al. | 340/407.2 |
| 2009/0249076 | A1* | 10/2009 | Reed et al. | 713/181 |
| 2009/0325551 | A1* | 12/2009 | Zellner et al. | 455/414.1 |
| 2010/0105417 | A1* | 4/2010 | Zellner et al. | 455/456.4 |
| 2011/0270786 | A1* | 11/2011 | Badger et al. | 706/11 |

* cited by examiner

*Primary Examiner* — Thai Hoang
(74) *Attorney, Agent, or Firm* — Birch, Stewart, Kolasch & Birch, LLP

(57) ABSTRACT

The present invention relates to a mobile terminal and a method of controlling an operation of the same. The method of controlling an operation of a mobile terminal includes driving a web browser and access a specific website, displaying a web page provided by the specific website, and when any one of numeric enter keys is pressed, displaying an entry window for inputting a website address. Accordingly, a user interface of an intuitive and natural control fashion can be provided to a user.

17 Claims, 12 Drawing Sheets

MOBILE TERMINAL AND METHOD OF CONTROLLING OPERATION OF THE SAME

CROSS-REFERENCE TO RELATED APPLICATION

This application claims the benefit of Korean Application No. 2007-0070755, filed Jul. 13, 2007 in the Korean Intellectual Property Office, the disclosure of which is incorporated herein by reference.

BACKGROUND OF THE INVENTION

1. Field of the Invention

The present invention relates to a mobile terminal in which, when a numeric enter key is pressed in the state where a specific menu is driven, an entry window for web access or search is displayed, and a method of controlling an operation of the same.

2. Description of the Related Art

With the improved performance of mobile terminals and the advent of various mobile platforms, mobile terminals could become able to perform a variety of supplementary functions other than the basic functions such as voice call or short message service (SMS). In particular, as mobile terminals to support the multimedia function, the Internet access function, and so on become practical, the supplementary functions that can be provided by the mobile terminals are further diversified.

However, as the supplementary functions provided by the mobile terminal are diversified, a menu structure for controlling an operation of the mobile terminal becomes a complicated hierarchical structure. To perform a necessary function, menus of the complicated hierarchical structure have to be carried out sequentially. For example, to access another website in the state where a web page is displayed by driving a web browser for Internet access in a mobile terminal, a menu, such as "Go To URL" or "Go To Bookmark", had to be selected in a menu such as Option. Further, in the case in which search is required in the state where a file viewer menu is selected and the contents of a file are displayed, it is necessary to return to a main menu and then reenter a menu for search.

Accordingly, a user who is not accustomed to the complicated menu structure of the mobile terminal may feel difficulty in use. Moreover, a user of a general mobile terminal may be free to use a numeric enter key for entering a website address or search words. Accordingly, there is a need for a method capable of controlling the operation of the mobile terminal in a more user-friendly way in consideration of the above points.

SUMMARY OF THE INVENTION

It is, therefore, an object of the present invention to provide a mobile terminal in which, when a numeric enter key is pressed in the state where a specific menu is driven, an entry window for web access or search is displayed, and a method of controlling an operation of the same.

In accordance with an embodiment of the present invention, there is provided a method of controlling an operation of a mobile terminal, including the steps of driving a web browser and accessing a specific website, displaying a web page provided by the specific website, and, when any one of numeric enter keys is pressed, displaying an entry window for inputting a website address.

In accordance with another embodiment of the present invention, there is provided a method of controlling an operation of a mobile terminal, including the steps of displaying a screen according to driving of a specific menu, when any one of numeric enter keys is pressed, displaying an entry window for search, and searching information, corresponding to a letter input through the entry window, and displaying searched information.

In accordance with an embodiment of the present invention, there is provided a mobile terminal, including a wireless communication unit for providing an interface for web access, one or more numeric enter keys for inputting a letter, a display unit for displaying a web page, and a controller for controlling a web page, which is provided by a website accessed through the wireless communication unit, to be displayed on the display unit and, in the case in which any one of the numeric enter keys is pressed in the state where a web page is displayed on the display unit, controlling an entry window for inputting a website address to be displayed on the display unit.

Further, according to the present invention, there is provided a mobile terminal including a numeric enter key for inputting any one of the Korean alphabet, the alphabet, and numerals, a display unit, and a controller for controlling a screen according to driving of a specific menu to be displayed on the display unit and, when any one of the numeric enter keys is pressed, controlling an entry window for search to be displayed and controlling information, corresponding to a letter input through the entry window, to be searched and displayed.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE INVENTION

Hereinafter, embodiments of the present invention will be described in detail with reference to the accompanying drawings so that they can be readily implemented by those skilled in the art.

It is to be noted that a mobile terminal described in this specification can include a mobile phone, a smart phone, a notebook computer, a terminal for digital broadcasting, a personal digital assistant (PDA), a portable multimedia players (PMP), a navigation device, and so on.

Figure 1:
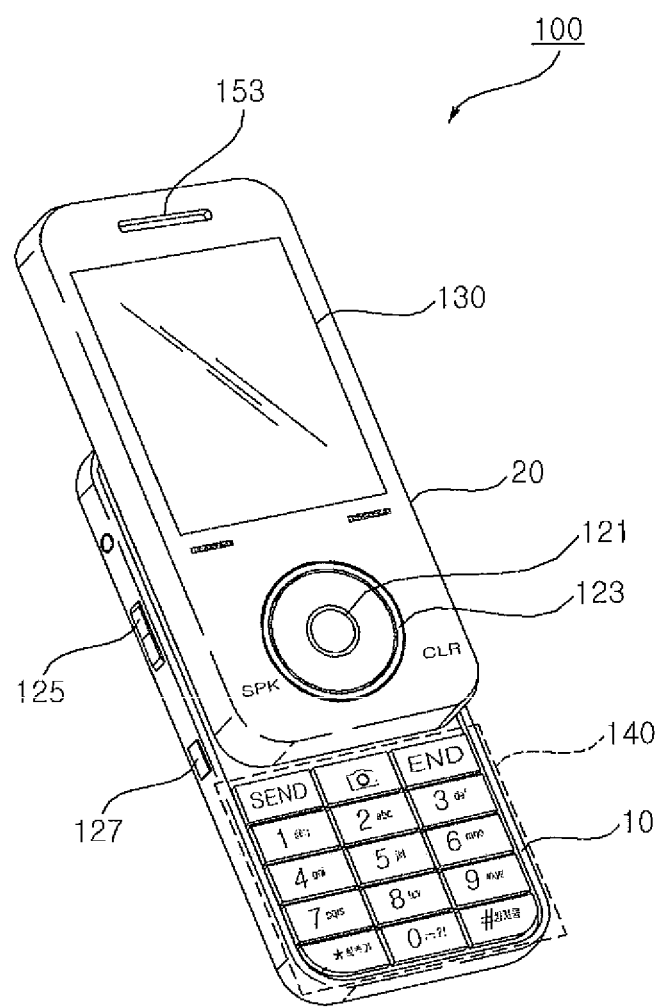
FIG. 1 is a diagram showing the external appearance of a mobile terminal in accordance with an embodiment of the present invention.

FIG. 1 is a diagram showing the external appearance of a mobile terminal in accordance with an embodiment of the present invention. Referring to FIG. 1, a mobile terminal 100 in accordance with the present embodiment includes a main body 10, and a cover 20 coupled to the main body 10 in a sliding manner such as sliding-up or sliding-down. The cover 20 is equipped with a display unit 130, such as a liquid crystal display (LCD), and a wheel key 121. The wheel key 121 has a button 123 for enabling a press entry provided at its center.

The main body 10 is equipped with a keypad 140. Accordingly, in the state where the cover 20 slides up, a telephone number for a call, an operation command from a user, data, and so on can be received through the keypad 140. The keypad 140 is equipped with numeric enter keys for entering the Korean alphabet, the alphabet, numerals, etc. A volume control key 125 for adjusting the sound volume, and the like and a hot key 127 for operating the camera function, and so on are disposed at the side of the main body 10.

Figure 2:
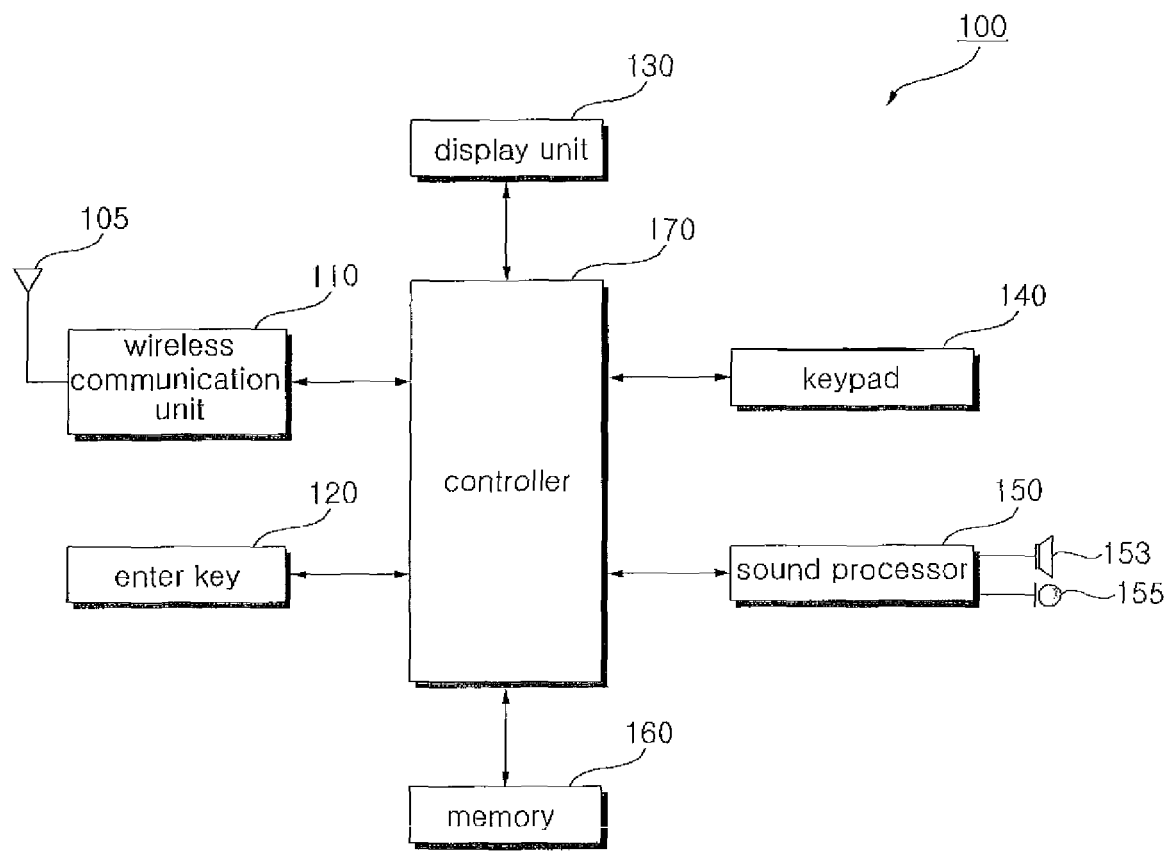
FIG. 2 is a block diagram of the mobile terminal in accordance with an embodiment of the present invention.

FIG. 2 is an internal block diagram of the mobile terminal in accordance with an embodiment of the present invention. Referring to FIG. 2, the mobile terminal 100 of the present embodiment includes a wireless communication unit 110, an enter key 120, the display unit 130, the keypad 140, a sound processor 150, memory 160, and a controller 170. Hence, when the above constituent elements are implemented in actual applications, two or more of the constituent elements may be combined into one constituent element or one of the constituent elements may be divided into two or more constituent elements, if appropriate.

The wireless communication unit 110 provides an interface for wireless communications with a base station through an antenna 105 and can include a duplex filter for filtering signals transmitted to or received from the antenna 150, a power amplifier for amplifying transmitting signals, a frequency uplink converter of a transmission route, a frequency downlink converter of a reception route, and so on. The wireless communication unit 110 further provides an interface for web access when an Internet access menu, etc. is selected. The wireless communication unit 110 can further include a broadcasting receiving module, a mobile communication module, a wireless Internet module, a local area communication module, a global positioning system (GPS) module and so on.

The enter key 120 includes the wheel key 121, the volume control key 125, the hot key 127, and so on. The enter key 120 transfers a signal, corresponding to a key pressed by a user, to the controller 170 and enables a specific function, which is selected by a user, to be performed.

The display unit 130 displays menus for operation control, a received signal status, battery information, information about the operating status of a mobile terminal according to a command input by a user, and the like. When an Internet access menu is selected, the display unit 130 displays web pages. When a file viewer menu is selected, the display unit 130 displays the contents of a selected file.

The keypad 140 includes numeric enter keys for entering the Korean alphabet, the alphabet, the numerals, etc. and specific function keys. The keypad 140 is adapted to transfer a signal, corresponding to a key pressed by a user, to the controller 170 and receive an operation command or data from a user, a command for setting a specific function, which is selected by a user, and so on.

The sound processor 150 amplifies a sound signal output from the controller 170 and outputs an amplified signal to a speaker 153 or the like, or converts a sound signal, which is received through a microphone (not shown), etc., into an electrical signal and transfers the converted signal to the controller 170.

The memory 160 can include at least one type of storage media, including a flash memory type, a hard disk type, a multimedia card micro type, card type memory (for example, SD or XD memory), RAM, and ROM. The memory 160 stores programs or data, which are necessary for an operation of the mobile terminal 100, various data or files that will be stored by a user, and the like. The memory 160 also stores information about addresses of visited websites, etc. Further, the mobile terminal 100 can operate web storage in which the storage function of the memory 160 is performed on an Internet.

The controller 170 controls the operation of each of the above constituent elements and controls an overall operation of the mobile terminal. For example, the controller 170 can perform pertinent control and processes for voice call, data communication, and videoconference and the like. The controller 170 may be equipped with a multimedia play module for playing multimedia. The multimedia play module may be hardwired within the controller 170 or configured as software separately from the controller 170.

In particular, in the case in which any one of the numeric enter keys is pressed in the state where a specific menu, such as the Internet access menu or the file viewer menu, is driven, the controller 170 controls an entry window for entering a website address, an entry window for search, etc. to be displayed.

Figure 3A:
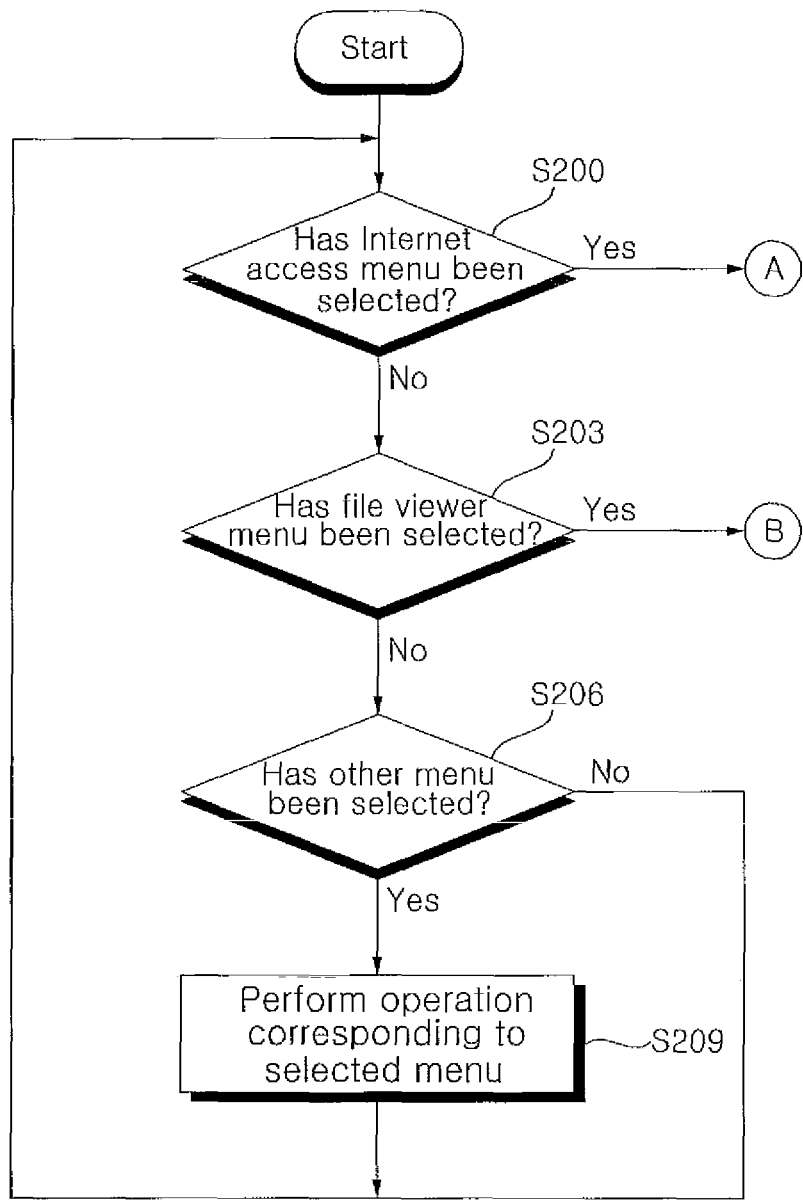
FIGS. 3A to 3C are flowcharts illustrating a method of controlling an operation of the mobile terminal in accordance with an embodiment of the present invention.
Figure 3B:
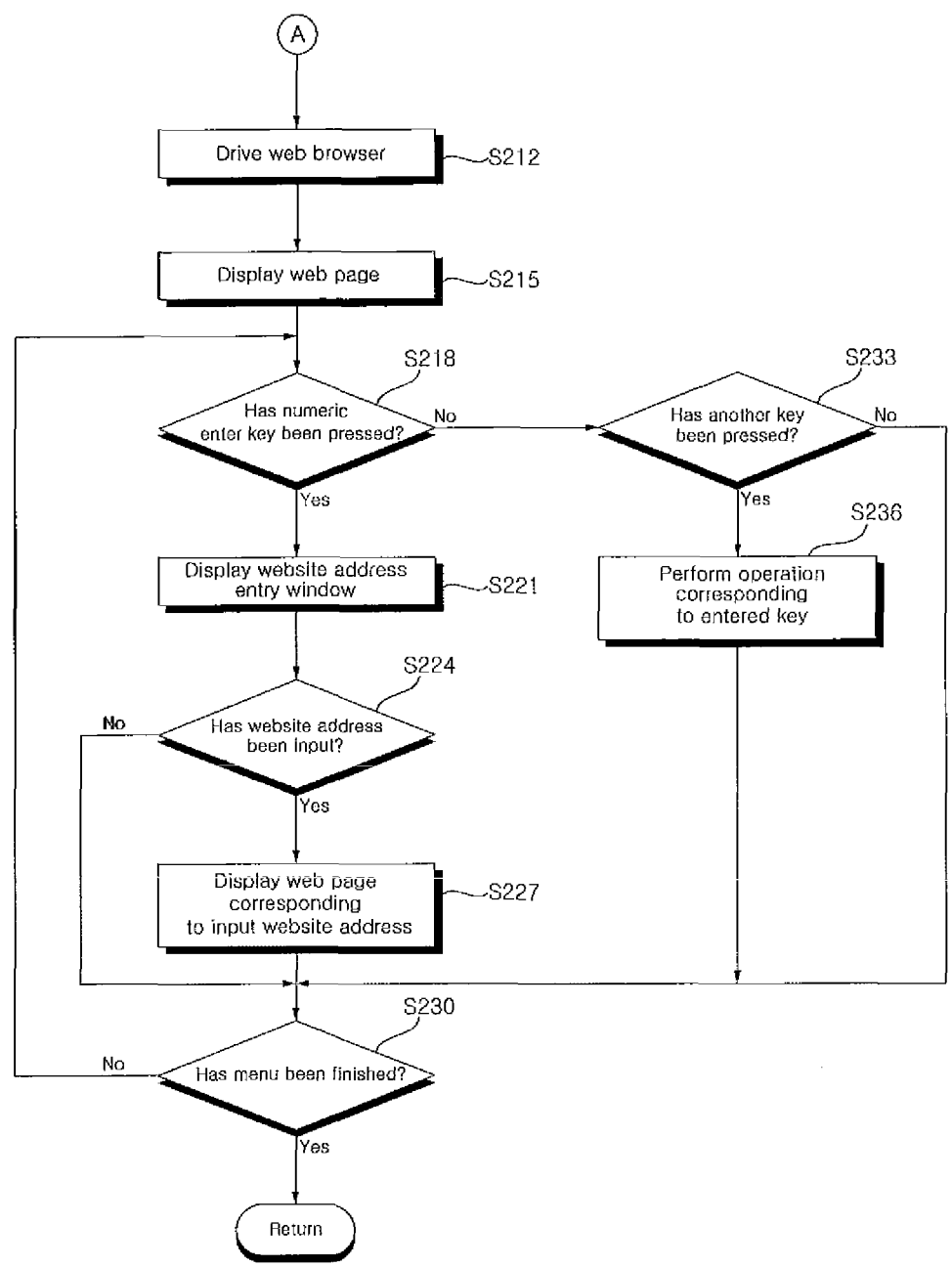
Figure 3C:
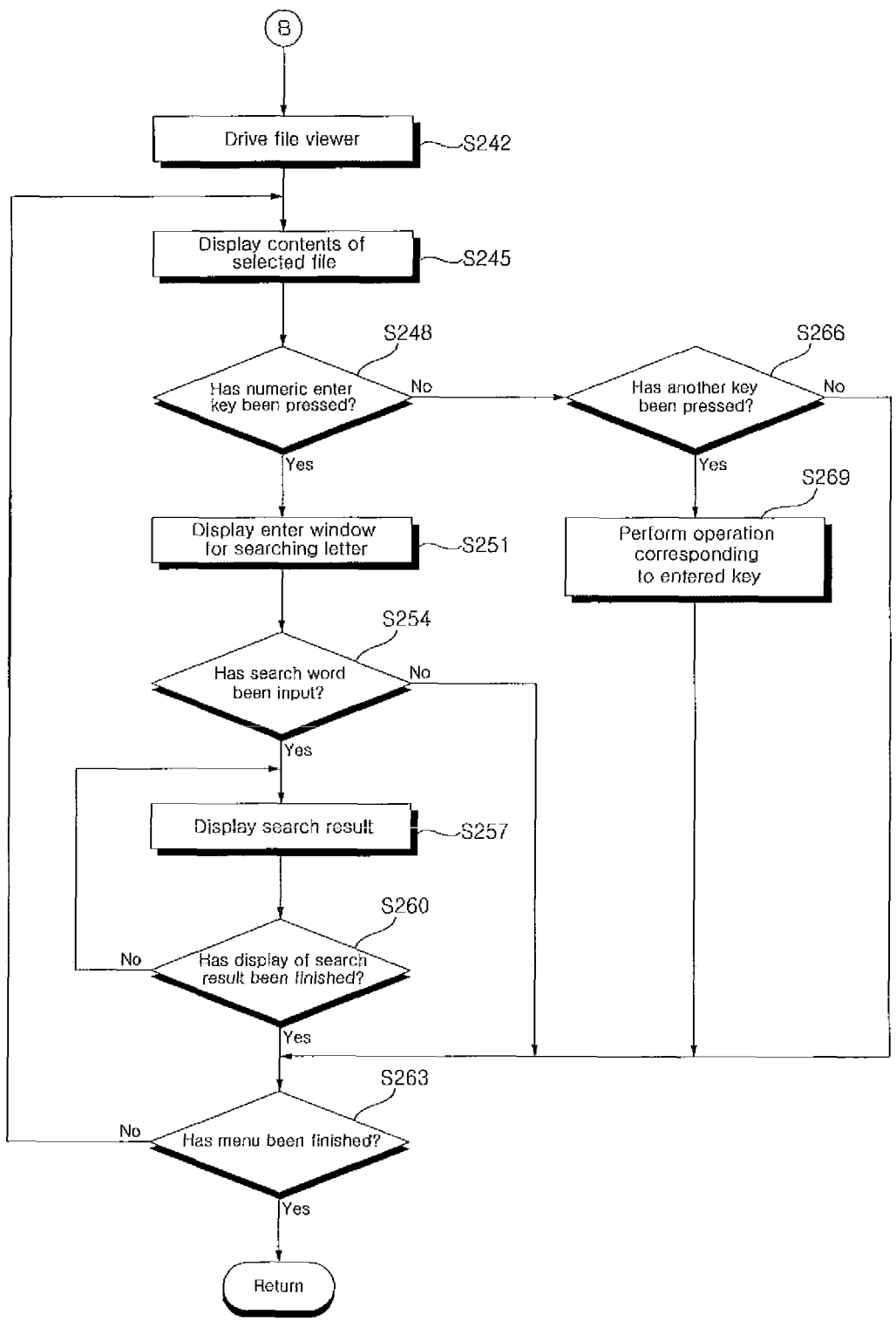

FIGS. 3A to 3C are flowcharts illustrating a method of controlling an operation of the mobile terminal in accordance with an embodiment of the present invention.

Referring to FIG. 3A, when an idle state or the Internet access menu in a main menu, etc. is selected, the controller 170 controls the Internet access menu shown in FIG. 3B, to be performed (S200). When the file viewer menu is selected, the controller 170 controls the file viewer menu, shown in FIG. 3C, to be performed (S203). When other menus are selected, the controller 170 controls operations, corresponding to the selected menus, to be performed (S206, S209).

FIG. 3B is a flowchart illustrating that the Internet access menu is selected. The controller 170 drives a web browser (S212), and accesses a selected website and controls a web page, provided by the accessed website, to be displayed on the display unit 130 (S215).

In the case in which any one of the numeric enter keys for entering the numerals, the Korean alphabet, the English alphabet, etc., which are included in the keypad 140 is pressed in the state where the web page is displayed on the display unit 130 (S218), the controller 170 controls a website address entry window for entering an uniform resource locator (URL) address of a website, which will be accessed, to be displayed on the display unit 130 (S221). Here, the website address entry window can be displayed as a pop-up window on a screen on which the web page is displayed.

In the case in which the website address has been entered through the website address entry window (S224), the controller 170 moves to a website corresponding to the entered website address and controls a web page, provided by the website, to be displayed (S227).

When the address of the website is entered, an automatic completion function can be provided on the basis of the history of visited websites. That is, in the case in which a letter is entered in the website address entry window, the controller 170 controls website addresses, including the entered letter, of website addresses stored in the memory 160, to be displayed. Here, website addresses registered with the Favorites can be displayed at levels upper than that of other addresses.

In the case in which a key other than the numeric enter keys is pressed in step (S233), the controller 170 controls an operation, corresponding to the pressed key, to be performed (S236). In the state where a web page is displayed, the key other than the numeric enter keys can include a key for screen control, such as screen movement or scrolling, a key for menu switching or the like.

The above process can be performed repeatedly until the execution of the selected Internet access menu is completed (S230).

FIG. 3C is a flowchart illustrating that the file viewer menu is selected. The controller 170 drives a file viewer (S242) and controls the contents of a selected file to be displayed on the display unit 130 (S245).

In the case in which any one of the numeric enter keys included in the keypad 140 is pressed in the state where the contents of a file are displayed on the display unit 130 (S248), the controller 170 controls the entry window for search to be displayed on the display unit 130 (S251). In this case, when the pressed numeric enter key is a long key entry in which the numeric enter key is pressed for a specific period of time, it can be recognized that an Internet is accessed and search is performed and, when the pressed numeric enter key is a general short key entry, it can be recognized that search is carried out within a selected document, and vice versa. According to this method, information entered in the search entry window can be searched according to inter-file search and Internet search.

After a search word(s) is entered through the search word entry window (S254), the controller 170 controls search results, which have been searched through a search process, to be displayed (S257), and the display of the search results continues until the end of the display is selected (S260). Here, a search engine used for the search can be included in the mobile terminal by default, but may be arbitrarily set by a user.

In the case in which a key other than the numeric enter keys is pressed in step (S266), the controller 170 controls an operation, corresponding to the pressed key, to be performed (S269). The above process can be performed repeatedly until the execution of the selected menu is completed (S263).

What the numeric enter key is pressed in order to enter a website address or perform search in the state where a web page or the contents of a file is displayed through a file viewer, as described above, can be considered as an intuitive and natural control method to a user. Accordingly, a convenient user interface can be provided to users. Further, although the case where the Internet access menu or the file viewer menu is selected has been described in the above embodiment, the method of controlling the operation of the mobile terminal in accordance with the present invention can also be applied to a variety of menus, such as when a specific area is searched with a map screen being displayed.

Figure 4:
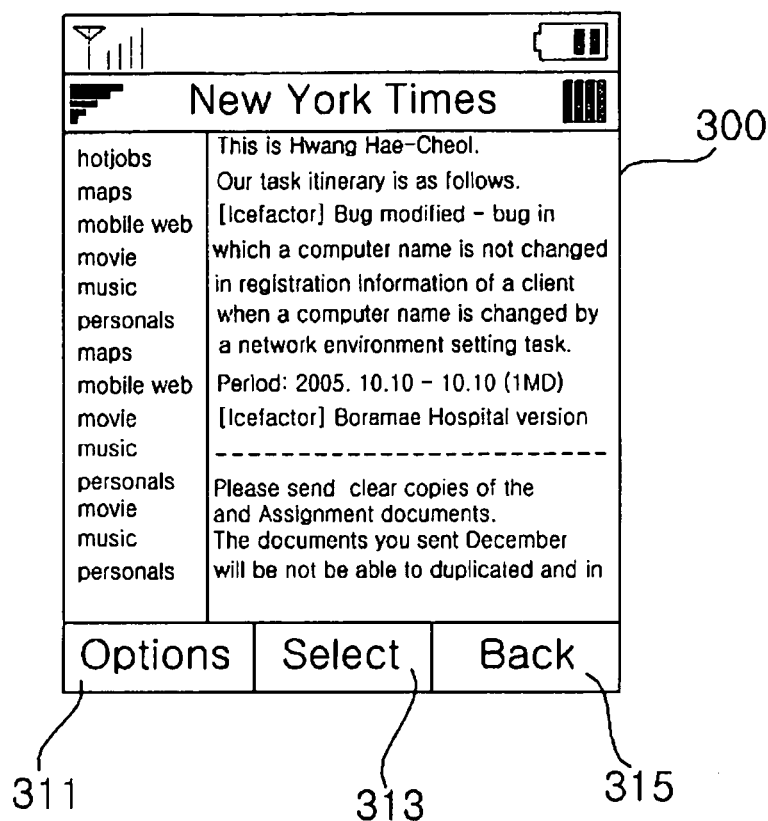
FIGS. 4 to 6 are views illustrating the method of controlling the operation of the mobile terminal in accordance with an embodiment of the present invention in a web page display screen.
Figure 5:
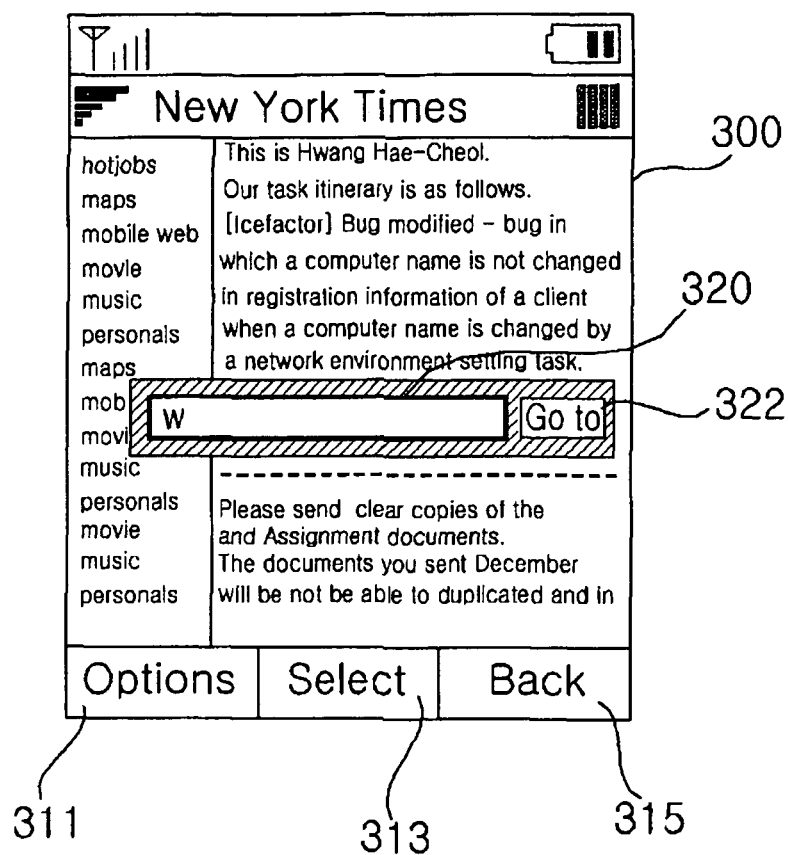
Figure 6:
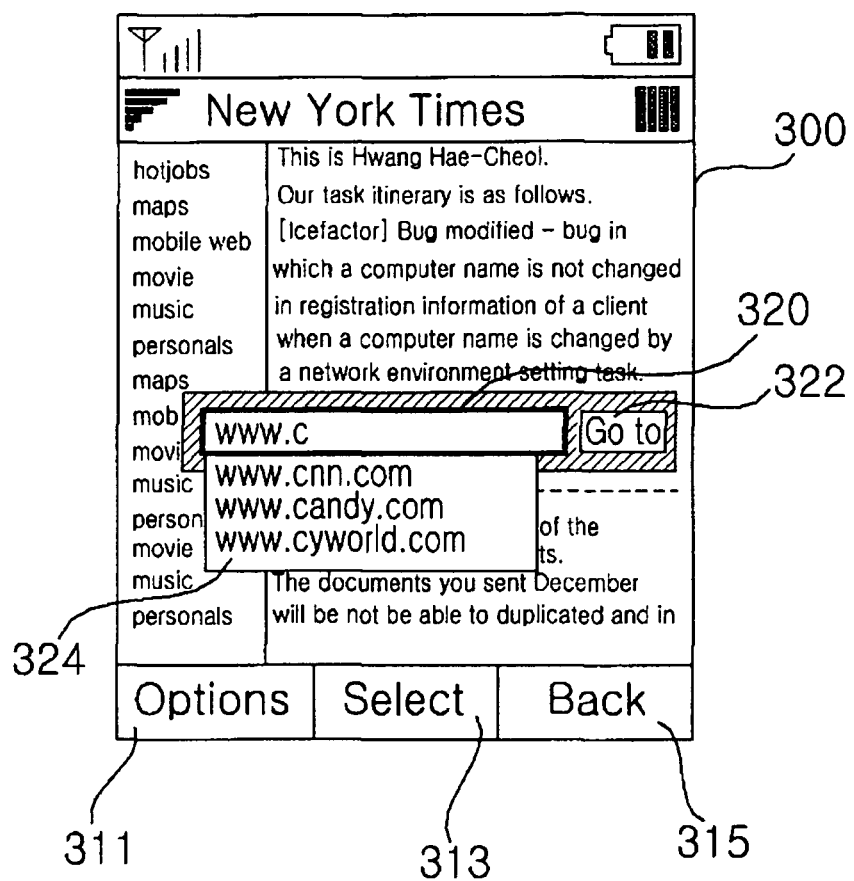

FIGS. 4 to 6 are views illustrating the method of controlling the operation of the mobile terminal in accordance with an embodiment of the present invention in a web page display screen. First, FIG. 4 shows a web page display screen 300 on which a web page provided by a specific accessed website is displayed. The web page display screen 300 displays one area of a web page provided by an accessed website. Menu items, such as OPTIONS 311 for selecting menu options, SELECT 313 for selecting menus, and BACK 315 for returning to a previous menu, are displayed at the bottom of the web page display screen 300.

FIG. 5 shows a website address entry window 320 for entering a website address in the case in which any one of the numeric enter keys is pressed in the web page display screen 300. When an address of a website is entered in the website address entry window 320 and a menu 'GO TO' 322 is selected, an existing website moves to the corresponding website, and a web page provided by the accessed website is displayed. FIG. 6 shows that, in the case in which a letter is input in the website address entry window 322, a history window 324 in which website addresses, including the input letter, of visited website addresses, are displayed is displayed under the website address entry window 322. A user can select any one of the website addresses from the history window 324 and access the selected website.

FIGS. 7 to 10 are views illustrating the method of controlling the operation of the mobile terminal in accordance with an embodiment of the present invention in a file viewer screen.

Figure 7:
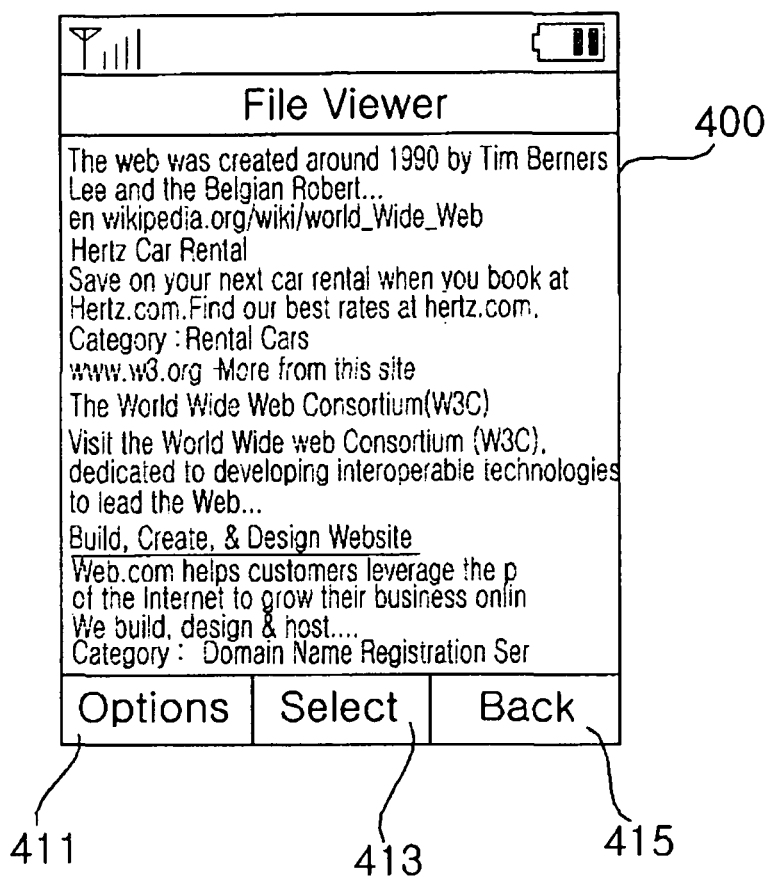
FIGS. 7 to 10 are views illustrating the method of controlling the operation of the mobile terminal in accordance with an embodiment of the present invention in a file viewer screen.
Figure 8:
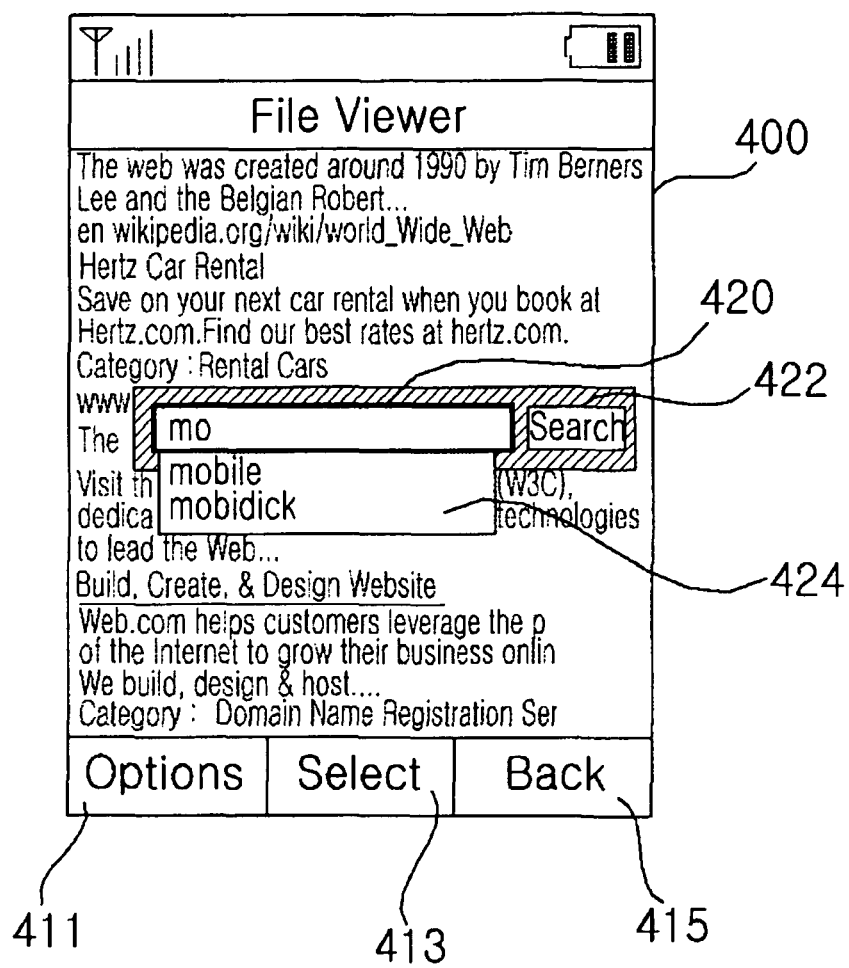

FIG. 7 shows a file viewer screen 400 in which the file viewer menu is executed and a selected file is displayed. Even in the case of the file viewer screen 400, the contents of a selected file are displayed. Menu items, such as OPTIONS 411 for selecting menu options, SELECT 413 for selecting menus, and BACK 415 for returning to a previous menu, are displayed at the bottom of the file viewer screen 400. FIG. 8 shows that, in the case in which any one of the numeric enter keys is pressed in the file viewer screen 400, an entry window 420 for search and a history window 424 for displaying search words, including an input letter(s), of stored search words are displayed.

Figure 9:
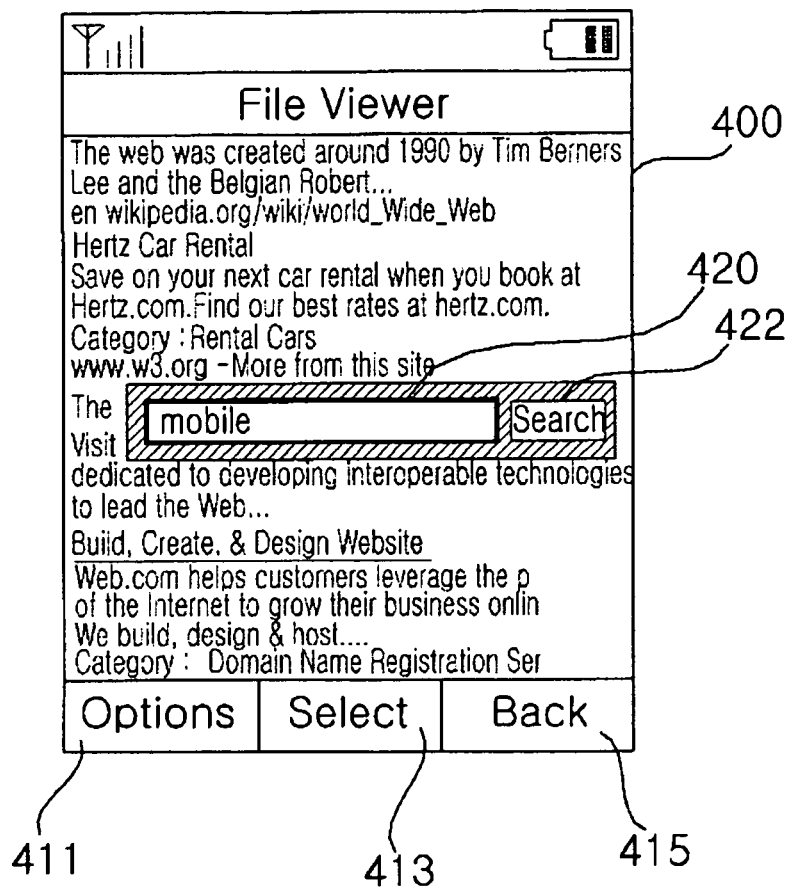

FIG. 9 shows a case where search words are input in the entry window 420 for search and a menu 'SEARCH' 422 is selected. Therefore, search is executed within a selected file according to whether the numeric enter key has been pressed as the long key or the short key or an Internet is accessed and search is executed, and results thereof are displayed.

Figure 10:
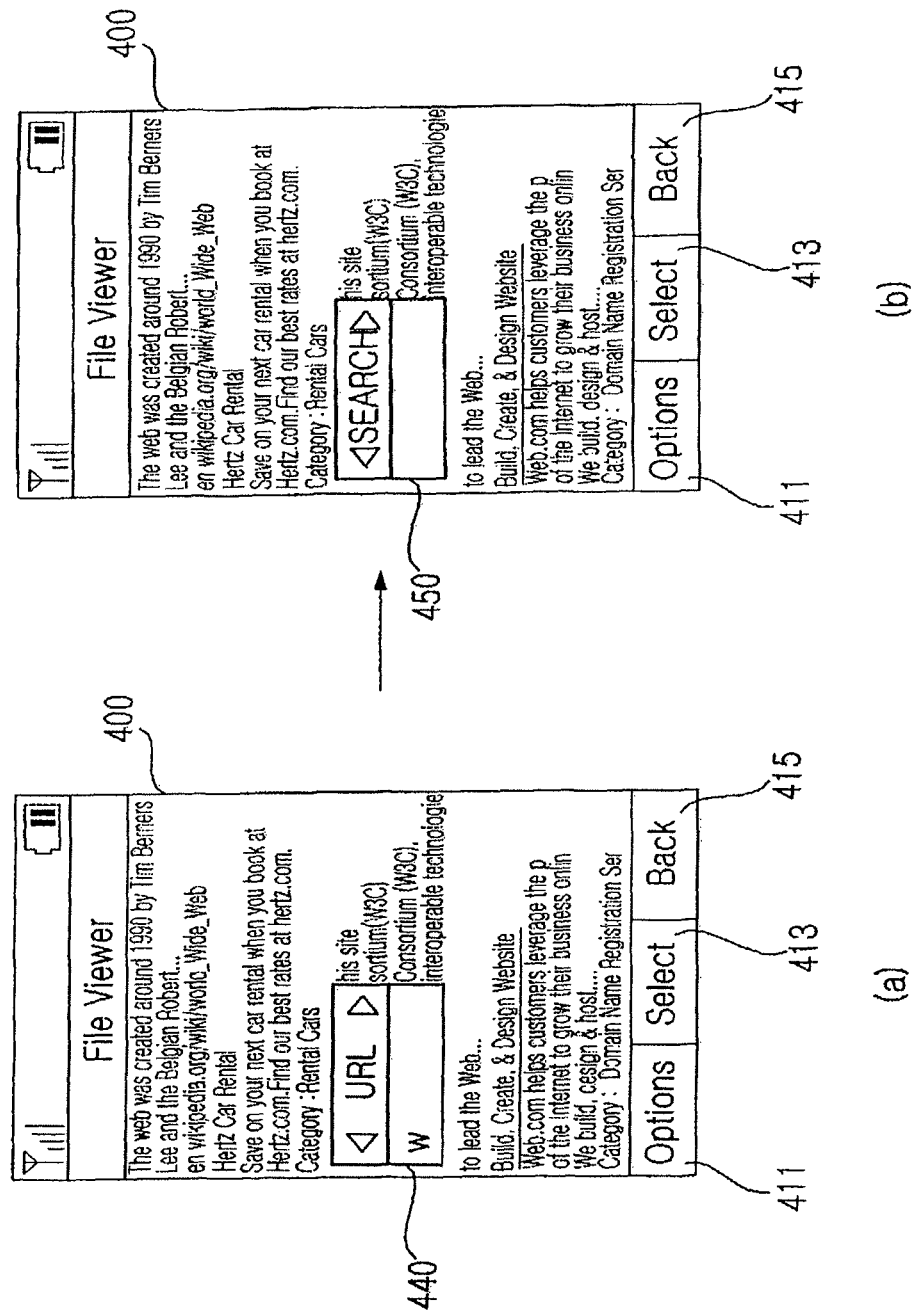

FIG. 10 shows that switching is performed between a website address entry window 440 as shown in FIG. 10(a) and an entry window 450 for search as shown in FIG. 10(b) according selection of a specific key. In addition, switching can be performed between an entry window for entering a website address and an entry window for search in various ways as well as the method of switching the entry window according to selection of a specific key.

Further, the mobile terminal and the method of controlling the operation of the same in accordance with the present invention are not limited to the constructions and methods described in connection with the embodiments, and all or some of the embodiments may be selectively combined so that they can be modified in various ways.

Meanwhile, the present invention can be implemented as a code readable by a processor included in a mobile terminal, such as a mobile station modem (MSM), in processor-readable recording media. The processor-readable recording media include all kinds of recording devices in which processor-readable data is stored. For example, the processor-readable recording media can include ROM, RAM, CD-ROM, magnetic tapes, floppy disks, optical data storages, and so on, and also include carrier wave forms such as transmission over an Internet. Further, the processor-readable recording media can be stored and executed as codes, which are distributed into computer systems connected over a network and readable by a processor in a distributed manner.

As described above, in accordance with the present invention, when any one of the numeric enter keys is pressed in the state where a specific menu, such as the Internet access menu or the file viewer menu, is driven, the entry window for inputting a website address or performing search is displayed automatically. Accordingly, a user interface of an intuitive and natural control fashion can be provided to a user. Further, in the case of the entry window for search, information input in the same search window can be searched according to inter-file search or Internet search separately according to whether an input is a long key input or a short key input.

While the invention has been shown and described with respect to the preferred embodiments, it will be understood by those skilled in the art that various changes and modifications may be made without departing from the spirit and scope of the invention as defined in the following claims.

What is claimed is:

1. A method of controlling an operation of a mobile terminal, the method comprising:
    displaying contents on a webpage screen in response to a selection of an Internet access menu or contents on a file viewer screen in response to a selection of a file viewer menu;
    receiving at least one letter input from a user while the contents are displayed;
    retrieving an entry window including the received at least one letter;
    additionally receiving remaining letters input from the user through the entry window; and
    executing one of Access of Internet, Search through Internet Access and Search within a file based on a text input in the entry window,
    wherein the execution of one of the Search through Internet Access and the Search within a file is decided in response to a long key entry in which a numeric enter key is pressed for more than a predetermined time, and the execution of an other of the Search through Internet Access and the Search within a file is decided in response to a short key entry in which the numeric enter key is pressed for less than the predetermined time.

2. The method of claim 1, wherein the step of executing the Access of Internet comprises accessing a website corresponding to a website address input through the entry window and displaying a web page provided by the accessed website.

3. The method of claim 1, wherein the entry window is displayed as a pop-up window.

4. The method of claim 1, further comprising:
    when another key other than numeric enter keys is pressed, performing an operation corresponding to the pressed key.

5. The method of claim 1, further comprising:
    displaying, a menu for initiating search of information corresponding to the input text, next to the entry window.

6. The method of claim 1, wherein the entry window includes a search window for performing a search within a file or search through Internet access.

7. The method of claim 1, further comprising:
    displaying, a history window that represents a plurality of website addresses including the input at least one letter among the previous visited website addresses, under the entry window when a letter is additionally input through the entry window.

8. The method of claim 7, wherein at least one website address registered with favorites among the plurality of website addresses is first displayed in the history window.

9. The method of claim 1, further comprising:
    displaying, a history window that lists a plurality of search words including the input at least one letter among the pre-stored search words, under the entry window when a letter is additionally input through the entry window.

10. The method of claim 1, further comprising:
    performing a switching operation of between an entry window for entering a website address and an entry window for search in response to selection of a predetermined key.

11. A mobile terminal comprising:
    a wireless communication unit configured to provide an interface for web access;
    one or more numeric enter keys configured to input a letter;
    a display unit configured to display contents on a webpage screen in response to a selection of an Internet access menu or contents on a file viewer screen in response to a selection of a file viewer menu; and
    a controller configured to receive at least one letter input through the one or more numeric enter key while the contents is displayed on the display unit, to retrieve an entry window including the received at least one letter, to receive remaining letters input through the entry window additionally, and to execute one of Access of Internet, Search through Internet Access and Search within a file based on a text input in the entry window,
    wherein the controller is further configured to decide the execution of one of the Search through Internet Access and the Search within a file in response to a long key entry in which a numeric enter key is pressed for more than a predetermined time, and decide the execution of an other of the Search through Internet Access and the Search within a file in response to a short key entry in which the numeric enter key is pressed for less than the predetermined time.

12. The mobile terminal of claim 11, wherein the controller is further configured to display, a history window that represents a plurality of website addresses including the input at least one letter among the previous visited website addresses, under the entry window when a letter is additionally input through the entry window.

13. The mobile terminal of claim 11, wherein the entry window is displayed as a pop-up window.

14. The mobile terminal of claim 11, wherein the controller is further configured to display, a history window that lists a plurality of search words including the input at least one letter among the pre-stored search words, under the entry window when a letter additionally is input through the entry window.

15. The mobile terminal of claim 11, wherein the numeric enter keys are included in a main body keypad.

16. The mobile terminal of claim 11, wherein the controller is further configured to display, a menu for initiating search of information corresponding to the input text, next to the entry window.

17. The mobile terminal of claim 11, wherein the controller is further configured to perform a switching operation of between an entry window for entering a website address and an entry window for search in response to selection of a predetermined key.

* * * * *